No. 835,061. PATENTED NOV. 6, 1906.
J. GEORGE, C. M. SHORTLE & B. C. WHITE.
GLASS CYLINDER DRAWING MACHINE.
APPLICATION FILED DEC. 8, 1902.

Witnesses:—
Carl H. Crawford
William H. Hall

Inventors:—
Japhus George
Christopher Michael Shortle
Bruce Clark White
by Poole & Brown
their Attorneys No. 835,061. PATENTED NOV. 6, 1906.
J. GEORGE, C. M. SHORTLE & B. C. WHITE.
GLASS CYLINDER DRAWING MACHINE.
APPLICATION FILED DEC. 8, 1902.

UNITED STATES PATENT OFFICE.

JAPHUS GEORGE, OF WILCOX, PENNSYLVANIA, CHRISTOPHER MICHAEL SHORTLE, OF BERNHARDS BAY, NEW YORK, AND BRUCE CLARK WHITE, OF CHICAGO, ILLINOIS; SAID GEORGE AND SAID SHORTLE ASSIGNORS, BY MESNE ASSIGNMENTS, TO NEWKIRK GLASS COMPANY, OF PIERRE, SOUTH DAKOTA, A CORPORATION OF SOUTH DAKOTA.

GLASS-CYLINDER-DRAWING MACHINE.

No. 835,061.     Specification of Letters Patent.     Patented Nov. 6, 1906.

Application filed December 8, 1902. Serial No. 134,314.

*To all whom it may concern:*

Be it known that we, JAPHUS GEORGE, a resident of Wilcox, county of Elk, and State of Pennsylvania, CHRISTOPHER MICHAEL SHORTLE, a resident of Bernhards Bay, in the county of Oswego and State of New York, and BRUCE CLARK WHITE, a resident of Chicago, county of Cook, and State of Illinois, have invented certain new and useful Improvements in Glass-Cylinder-Drawing Machines; and we do hereby declare that the following is a full, clear, and exact description thereof, reference being had to the accompanying drawings, and to the letters of reference marked thereon, which form a part of this specification.

This invention relates to apparatus for drawing glass cylinders and like articles such as are made especially for manufacturing sheet-glass by opening the cylinders and spreading the same flat in a familiar manner.

A convenient manner of forming and drawing the cylinders is to dip into a mass of molten glass a suitably-shaped bait to which the molten glass fuses at its margin and adheres, so that when the bait is drawn upwardly a hollow glass cylinder follows it, the cylinder being divided between its ends to produce cylinder-sections of any desired length, and the drawing of the lower or stub end of the cylinder being meanwhile continued as the cylinder-sections are divided and removed therefrom.

The invention consists in the various matters hereinafter set forth and more particularly pointed out in the appended claims.

Among the principal objects of our invention is to produce an apparatus for drawing glass cylinders which is so constructed that when the cylinder is once lifted or drawn from the body of molten glass the bait may be parted from the cylinder while the lower or stub end of the cylinder remains continuous or integral with the body of molten glass, the drawing of the stub being continued and the cylinder being parted or divided to produce sections of a desired length and which when parted are removed to a suitable repository. In other words, it is the object of the invention to draw a continuous cylinder from a mass of molten glass and to sever cylinder-sections therefrom.

Another object of our invention is to provide means for continuously removing the parted cylinder-sections to a suitably-located repository.

A further object of the invention is to provide means for sealing the stub end of the cylinder—*i. e.*, that continuous with the molten glass—and for introducing air or other fluid into the cylinder below the seal during the drawing operation, whereby a predetermined pressure may be maintained in the cylinder.

A still further object of the invention is to provide a combined gripping and sealing device adapted to grip the upper end of the cylinder-stub and by which when lifting power is applied thereto the drawing operation may be effected and whereby the leakage of air through the upper end of the cylinder is prevented while being thus drawn.

A further object is to provide a gripping device which will also serve as a means for removing the detached cylinder-sections.

A further object of the invention is to provide a passage through the gripping device by which air or other fluid may be forced into the cylinder as desired.

Another object of the invention is to provide means for sustaining the cylinder-stub after a cylinder-section has been parted therefrom and while said detached cylinder-section is removed and until the upper end of the cylinder-stub is again grasped by the gripping device.

Another object of the invention is to provide two or more gripping devices or their equivalents operating in connection with a lifting and removing mechanism and adapted to be brought successively into operative relation to the cylinders and through the medium of which the cylinders are successively drawn and after being parted the detached cylinder-sections are carried to a suitable repository, whereby said drawing and removing mechanism is continuously operated to draw the cylinders from the melting-tank and to remove the same.

Still another object of the invention is to provide means employed when the cylinders are intermittingly drawn for applying heat to the cylinder-stub at the line of departure thereof from the molten glass at a time when said cylinder-stub is stationary, thereby preventing cooling and thickening of the base of the cylinder-stub and avoiding variations of thickness of the wall of succeeding cylinders.

Other objects of the invention will appear from the ensuing description and the appended claims.

As shown in the drawings, A designates the forehearth or extension in a glass furnace and contains the molten glass from which the cylinders are to be drawn. Said forehearth is provided at its upper side with a draft-opening through which the cylinders are drawn.

$A'$ designates a refractory shield and skimmer which projects at its lower margin into the molten metal and serves to prevent the impure surface of the molten glass from finding its way to the draft-opening of the hearth and also to prevent the radiated heat of the molten glass from impinging against the cylinder as it emerges from the molten glass.

B designates a bell-shaped bait which is adapted to be lowered into the draft-opening of the forehearth with the margins thereof immersed in the molten glass and to be held therein until fusion takes place, after which the bait is lifted, together with an adhering glass cylinder, in a manner familiar to those acquainted with the art of drawing glass. Said bait may be made of any suitable material, but is preferably made of iron.

Figures 9, 10, 11:
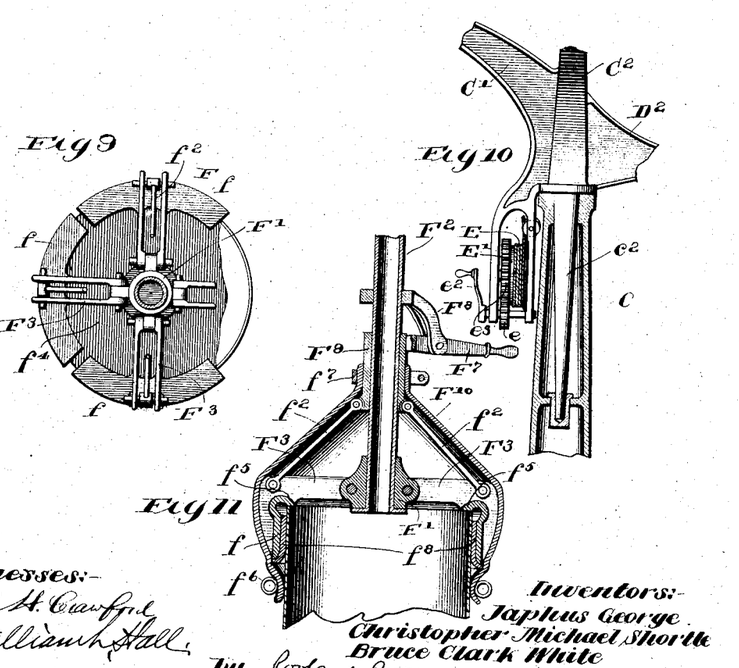
Fig. 9 is a plan view taken on line 9 9 of Fig. 8.
Fig. 10 is a fragmentary detail illustrating the manner of rotatively mounting the upper end of the lifting mechanism on the standard supporting said mechanism.
Fig. 11 is an axial vertical section of a modified form of gripping device.

C designates a vertical standard, in which is mounted at its upper end a rotative head having radially-extending arms $C'$ $C^2$ $C^3$. Said arms $C'$ $C^2$ are adapted by rotation of the head to be swung to bring the ends thereof vertically over the draft-opening of the forehearth. The rotative head is provided with a stepped bearing, which is mounted in the standard, as shown in Fig. 10, the head being provided with a reduced rod or stem $c^2$, which engages a suitable socket in the upper end of the standard. The arm $C'$ is provided with a pulley $c$, over which is trained a cable D, which supports the bait B and by which the bait is raised and lowered. The end of the cable remote from the bait is trained over a rotative drum $D'$, said drum having trunnions which are rotatively mounted in a bracket $D^2$, which constitutes part of the head and projects in a direction opposite to that of the arm $C'$. Said drum is provided with a rigidly-connected gear-wheel $d$, as clearly shown in Fig. 2, which meshes with a gear-pinion $d'$, attached to a rotative shaft $d^2$, which has bearing in said bracket $D^2$. Attached to said shaft $d^2$ is a crank $d^3$, by which rotative motion is given to said drum to raise and lower the bait, and an attached cylinder, as will hereinafter more fully appear.

F F designate gripping devices which are adapted to grip the upper end of the cylinder-stub after the bait or a cylinder-section has been parted therefrom. The said gripping devices are each attached to one end of a cable E, which is trained over guide-pulleys $e'$ $e'$, rotatively mounted in the outer ends of the arms $C^2$ $C^2$. Said cable is wound between said pulleys about a drum $E'$, being wound about said drum a sufficient number of times to afford the necessary friction to prevent slipping of said cable thereon. Said drum is provided with a rigidly-attached gear-wheel $e^3$, which meshes with a gear-pinion $e$, mounted on a shaft $e'$ and provided with a crank $e^2$, by which said drum and the cable trained thereover are given motion. The cables D and E are attached directly to the upper ends of pipes $B'$ and $F^2$, which extend, respectively, through the bait and gripping devices and through which air is admitted to the interior of the cylinders during the drawing operation for the purpose of preventing the cylinders from contracting at the line of departure from the molten glass. Said gripping devices are constructed to remove the severed cylinders. Said pipes $F^2$ $F^2$ and the pipe $B'$ are connected, by means of flexible pipes $B^2$ and $F^7$ $F^7$, with a distributing-head $B^3$, supported in any suitable manner on the rotative head referred to. The distributing-head communicates with a suitable source supplying air or other fluid under pressure. Each of said pipes $B^2$ $F^7$ is provided with a hand-actuated valve for controlling the volume of air passed therethrough. The flexible pipes $B^2$ and $F^7$ permit angular movement of the head with respect to its supporting-standard. The introduction of air into the cylinder through the bait and gripping devices is a convenient means of supplying air to the cylinder; but it will be understood that so far as the broader features of my invention are concerned air may be otherwise supplied to said cylinders during the drawing operation and the cylinders may be otherwise sealed.

In the operation of the machine illustrated a suitable length of cylinder is first drawn upwardly by the bait and the drawing operation suspended to permit the bait to be parted from the cylinder. The cylinder thus deprived of its support is temporarily sustained by a stationary gripping device, said device being conveniently of annular form and through which the cylinders are drawn. After the bait is removed one of the movable gripping devices is engaged with the upper end of the cylinder-stub, and by power applied to the gripping device the cylinder is lifted and the drawing operation continued. Thereafter the drawing operation is suspended and the integral cylinder or stub is supported by the stationary gripping device during the time the cylinder is parted and while the detached section is removed. These operations are repeated so long as the operation of the apparatus is continued.

Figures 7, 8:
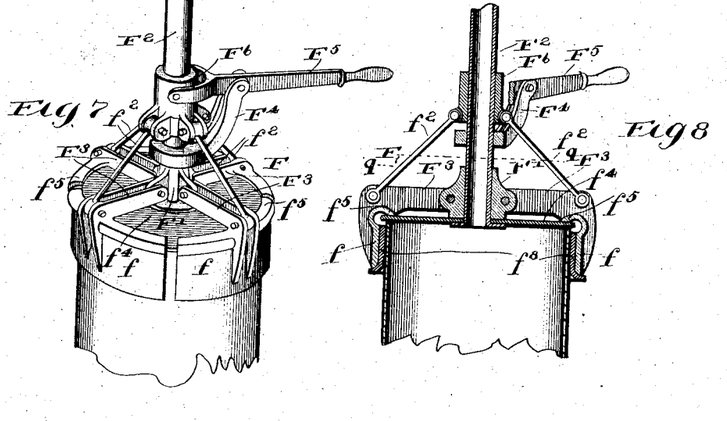
Fig. 7 is a perspective view of one of the devices for gripping the upper end of the cylinder.
Fig. 8 is an axial vertical section thereof.

Referring now to the features of construction of the gripping devices F herein illustrated, F', Figs. 7, 8, and 9, designates a head which is fixed to the lower end of the air-pipe $F^2$. To said head are pivoted four radially-directed vertically-swinging gripping-arms $F^3$, which are provided at their outer ends with vertical gripping-flanges $f$, having horizontally-curved faces to engage the cylindric surfaces of the cylinders. The inner faces of said arms are lined with a suitable heat-insulating material $f^8$, such as asbestos. Attached to the lower end of the pipe $F^2$ below the head F' is a circular horizontal disk $f^4$, made of insulating material and of sufficient diameter to close or seal the upper end of the cylinder. The margin of said disk is clamped between the end of the cylinder and shoulders $f^5$ on the lower faces of the gripping-arms. When the gripping device is engaged with the cylinder, as shown in Fig. 8, the upper end of the cylinder is sealed, so that air forced into the cylinder through the pipe $F^2$ or otherwise will not escape therefrom between said cylinder and gripping device. Said gripping-arms are adapted to be raised and lowered to detach the same from and attach the same to the cylinder by the following mechanism: Each of said gripping devices is provided with a bracket $F^4$, which is fixed to the pipe $F^2$, and to which is pivoted a lever $F^5$. Said lever is connected at its inner end with a sleeve $F^6$, which has longitudinally-sliding engagement with the pipe $F^2$. Said sleeve $F^6$ is connected, by means of radially-directed links $f^2$, with the gripping-arms $F^3$ near the outer ends of the latter, as clearly shown in Figs. 7 and 8. When the lever is raised, therefore, the gripping-flanges are moved toward each other in a manner to grip a cylinder surrounded thereby, and when said lever is depressed said gripping-flanges are moved outwardly in a manner to release a contained cylinder. When the gripping-flanges $f$ are forced inwardly against the upper end of a cylinder and the gripping device raised, the friction of the insulating facing of the gripping-flanges acts to hold the same in their gripping relation and prevents the cylinder dropping away therefrom.

In Fig. 11 is shown a slightly-modified form of the gripping device. In this construction the operating-lever $F^7$ of the gripping device is pivoted to a bracket $F^8$, which is fixed on the pipe $F^2$, and the lever is loosely connected at its inner end with a sleeve $F^9$, corresponding in function to the sleeve $F^6$ of the construction previously described. With the construction shown in Fig. 11 the gripping-flanges are moved toward the cylinder when the lever $F^7$ is swung downwardly and are released from a contained cylinder when said lever is swung upwardly. In this construction the sealing and insulating disk $f^4$ is omitted, and in lieu thereof the gripping-flanges and arms, the sleeve $F^9$, and the link $f^2$, connecting said sleeve and arms, are surrounded by an insulating-hood or shield $F^{10}$. The shield $F^{10}$ extends below the gripping-flanges, and the lower margin thereof is pressed upon the exterior surface of the cylinder by means of an elastic clamping-ring $f^6$, which is constructed to afford an air-tight joint between said shield and the cylinder. The upper tapered end of the shield terminates in a cylindric portion which surrounds the sleeve $F^6$ and is clamped thereto by a clamping-ring $f^7$. If desired, the sealing-disk $f^4$ may be employed with the construction last described.

Two gripping devices are attached to the cable, one to each end thereof, so that when one of said devices is raised the other is lowered, and vice versa. The said gripping devices and attached cylinders act, therefore, at certain times in the operation of the machine to counterbalance each other, thereby reducing the power necessary to operate the lifting-cable.

After the bait B has been parted from the upper end of the first cylinder the gripping devices are employed, the cylinder is further drawn, and the upper end parted therefrom to remove the detached cylinder and deposit the same upon a suitable repository, such as a car L. Said gripping devices are operated alternately to lift the detached cylinders and to remove them to the repository, the rotative head for this purpose swinging alternately from right to left to bring one of the gripping devices over the draft-opening of the fore-hearth and the other over the repository.

Figure 1:
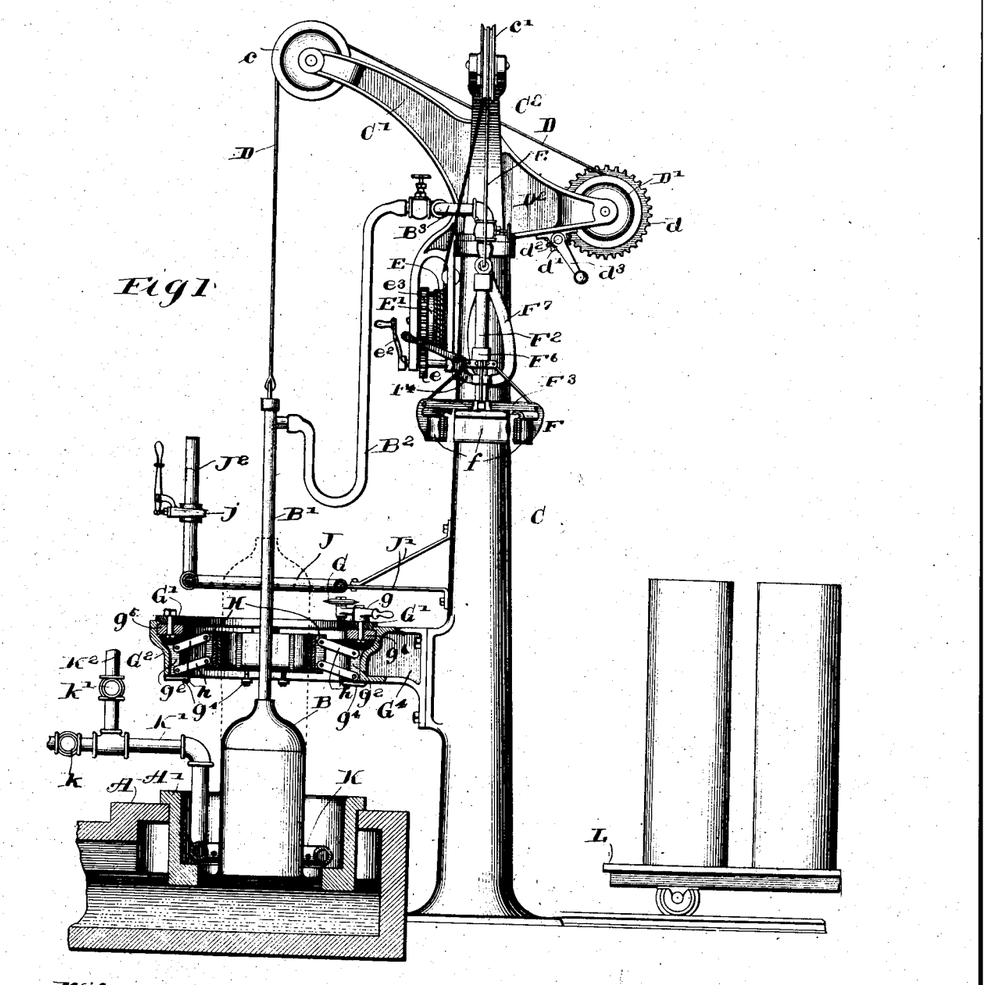
Figure 1 is a side elevation with parts in section of a machine made in accordance with our invention.
Figure 2:
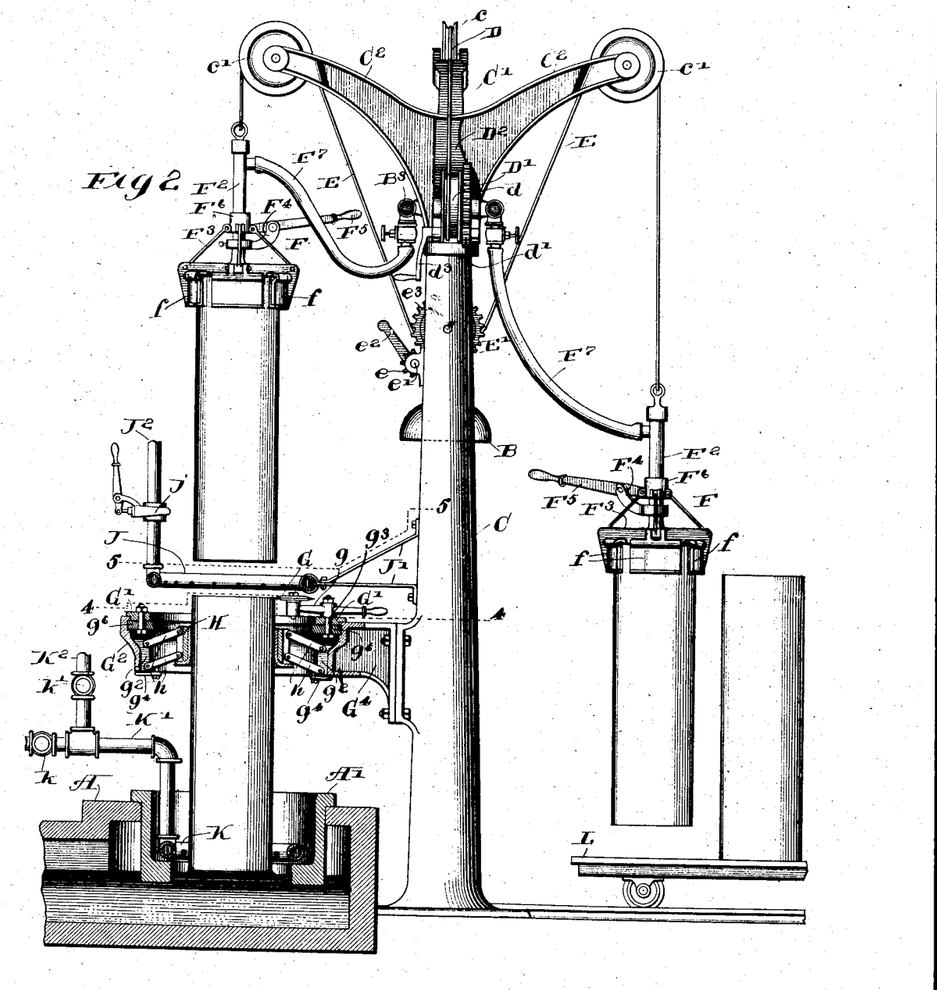
Fig. 2 is a similar view with certain of the parts in changed positions.
Figure 3:
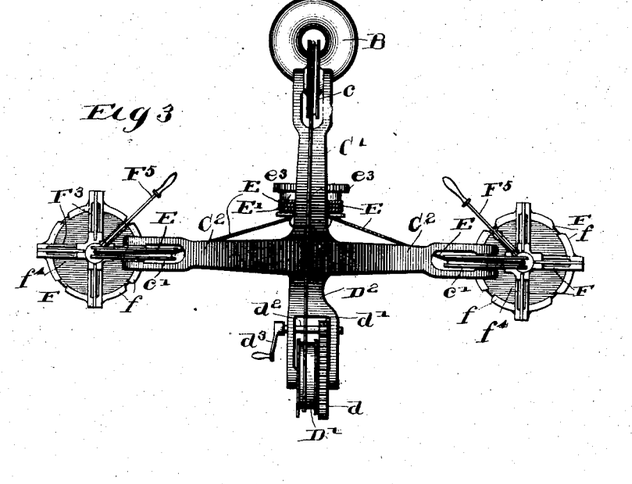
Fig. 3 is a plan view of the drawing and lifting mechanism.
Figure 4:
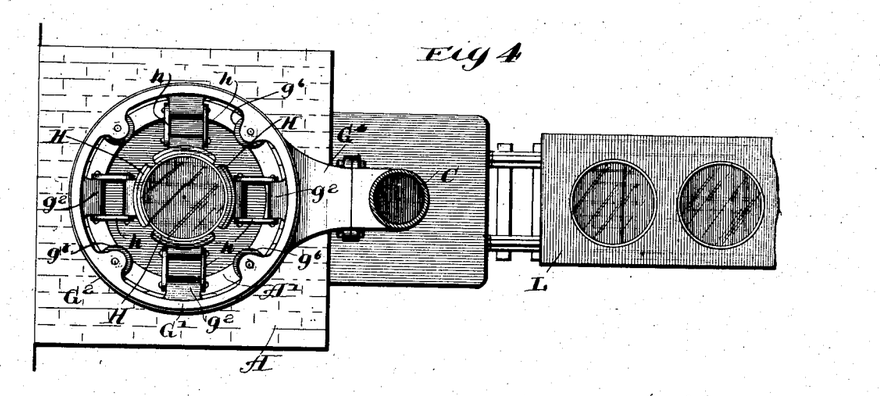
Fig. 4 is a plan section taken on line 4 4 of Fig. 2.
Figure 5:
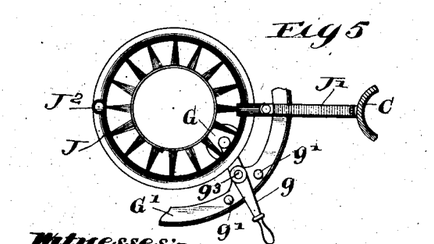
Fig. 5 is a plan section taken on line 5 5 of Fig. 2.
Figure 6:
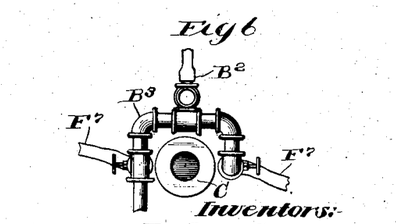
Fig. 6 is a detail illustrating the air-distributing head by which air or other fluid is distributed to the several gripping devices and the bait.

The parting of the cylinders may be effected in any suitable manner. As herein shown, said parting is effected by means of a rotating cutting-disk G, which is supported on a ring G', which has rotative engagement with an annular frame G², located vertically above the forehearth and supported from the standard C by a bracket G⁴, as shown in Figs. 1 and 2, through which annular frame the cylinders are drawn. As herein shown, said ring G' which supports the cutter-disk, is provided with horizontal antifriction-rollers g⁶, which engage vertical bearing-surfaces on the inner surface of the frame G² in the manner clearly shown in Figs. 1, 2, and 4. Said rollers extend under an annular horizontal flange on the upper margin of the annular frame, which prevents rising of the ring and cutter. The cutting-disk G is rotatively mounted in the inner end of a horizontally-swinging lever g, which latter is pivoted between its ends on a vertical pivot-pin g³, which extends through the rings G' and one of the rollers g⁶. The relation of the lever g to the cylinder is such that when a lever is swung in one direction the cutting-disk G is forced against the cylinder and when swung in the other direction said disk is moved away from the cylinder. The swinging movement of the lever is limited by pins g' g', as shown in Fig. 5, rising from the ring G'. The lever acts, therefore, not only to force the disk against the cylinder, but to rotate the ring G', and thereby carry the rotating disk around the cylinder in cutting relation thereto, and thereby part the cylinder on the line traced by the cutter.

The cylinder is preferably heated at the parting-line to facilitate the action of the cutter. As herein shown, said cylinder is heated by a circular pipe J, which surrounds said cylinder above the cutter and is provided with a plurality of jet-openings which are so located as to direct the heating-jets against the cylinder in line with the plane of the cutting edge of the cutting-disk. Said pipe J is supported from the standard by means of brackets J'.

It will of course be understood that the heating-jets will be directed against the cylinder only when a parting of the cylinder takes place or when the bait is parted from the first cylinder-section drawn. The supply-pipe J² of said ring is provided with a valve j to control the flow of gas through said ring. The valve is preferably so arranged as not to entirely cut off the flame from the burner when the heating is discontinued, so that upon a resumption of the full flow of the gas the ignition thereof will automatically occur. The stationary gripping device by which the cylinder-stub or cylinder integral with the molten glass is sustained until gripped by one of the movable gripping devices (employed when the drawing operation is intermittent) is made as follows:

H H designate four curved gripping-segments located within the frame G² and so constructed and arranged as to form, when brought together in gripping relation, an almost complete circle. Said gripping-segments are faced or lined with suitable insulating material, such as asbestos. Each segment is connected with the frame by four links h h, two on each side and one above the other, and said links are pivoted at their inner ends to the segments and at their outer ends to lugs q² on the inner face of the frame G². Said links are inclined upwardly and inwardly, as indicated in Figs. 1 and 2, and are prevented by suitable stops g⁴ from falling below a certain level. When the bait is originally lowered into the molten glass in the forehearth, said gripping-segments may be lifted to permit the bait to pass therethrough, (if the bait be made of the full diameter of the drawn cylinder,) and the shape of said bait is such that when drawn upwardly it acts to separate the segments and permit the cylinder to pass upwardly between the same in engagement with said segments. The bait may be made smaller than herein shown and the cylinder expanded to the desired diameter by air-pressure introduced into the cylinder. When the cylinder has been parted above the stationary gripping device, the inclination of said links and the engagement of the cylinder with the frictional contact-surfaces of the segments are such as to press said segments against the cylinder in a manner to support by friction the cylinder-stub and prevent the same sinking backwardly into the molten glass. The cylinder-stub after a cylinder-section has been removed therefrom extends above the stationary gripping device a sufficient distance to permit engagement of the upper end of said cylinder by one of the movable gripping devices F. After said gripping device has been engaged with said cylinder the drawing operation is resumed, and when the same has been raised to the desired height the said cylinder is again parted in the manner described. After such parting occurs the stationary gripping device described again acts to support the cylinder-stub in position to be thereafter engaged by the other gripping device F. It will be observed that as the head on which said gripping devices are supported is swung to bring one of the devices into engagement with the upper end of the cylinder-stub the other gripping device and detached cylinder supported thereby are being swung toward the repository on the opposite side of the apparatus upon which the detached cylinder is deposited. These operations are repeated in the sequence mentioned above so long as the drawing operation proceeds.

Means are provided for chilling the lower end of the cylinder near its line of departure from the molten glass in the forehearth, so as to give sufficient body or rigidity to the cylinder to resist the natural drag of the molten glass and to retain its form and the desired thickness of the cylinder-walls. Such cooling of the cylinder may be effected in any suitable manner—as, for instance, by radiation or by directing a cooling agent against the outer surface of the cylinder. In the present instance I have shown the latter construction. As herein shown, K designates a pipe which is located within the combined shield and skimmer A' and surrounds the cylinder near its line of departure from the molten glass. Said pipe is provided on its inner face with a plurality of jet-openings or may be provided with a continuous slit, through which the cooling agent is directed from the pipe to the surface of the cylinder. The cooling-ring is provided with a supply-pipe K', adapted for connection with a suitable source supplying a cooling agent. Said supply-pipe is provided with a valve k, adapted for controlling the supply of cooling agent to the said ring.

When the cylinder is intermittingly drawn, it may be desirable to provide means for directing a heating agent against the outer surface of the cylinder-stub during the suspension of the drawing operation, and thereby preventing the chilling of the glass during such stoppage and consequent thickening of the cylinder-walls. The heating agent may conveniently be applied to the cylinder through the same ring K which supplies the cooling agent during the drawing process, for the reason that at the time of such interruption of the drawing process the cooling agent should be withdrawn. In the present instance I have shown the pipe K' as provided with a branch K², which is adapted for connection with a suitable source supplying a heating agent. The heating agent will desirably consist of a combustible gas which is directed upon the cylinder through the pipe and is ignited by the heat at the base of the cylinder-stub. The pipe K² is provided with a hand-actuated valve k' to turn off and turn on the heating agent as desired.

It is evident that various modifications other than those indicated can be made and the invention still be employed in whole or in part and also that parts of the invention may be used separately.

In the foregoing description details have been given with some minuteness. This has been done to disclose information to those skilled in this art such as will enable them to make and use the invention and not with the intention of limiting the invention to the structural details, proportions, shapes, and materials mentioned.

We claim as our invention—

1. A glass-cylinder-drawing apparatus comprising a bait for drawing a cylinder from molten glass, means for parting the bait from the cylinder, and an annular grip for continuing the drawing of the cylinder from which the bait has been parted.

2. A glass-cylinder-drawing apparatus comprising a bait for drawing a cylinder from molten glass, means for parting the bait from the cylinder and for segregating cylinder-sections from the drawn cylinder while it remains integral with the molten glass, and an annular grip for continuing the drawing of the cylinder-stub from which the bait or a cylinder-section has been parted.

3. A glass-cylinder-drawing apparatus comprising a bait for drawing a cylinder from molten glass, means for parting the bait from the cylinder, and for segregating cylinder-sections from the drawn cylinder while it remains integral with the molten glass, means for removing the segregated sections to a repository, and an annular grip for continuing the drawing of the cylinder from which the bait or a cylinder-section has been parted.

4. A glass-cylinder-drawing apparatus comprising means for drawing a cylinder from molten glass, means for segregating cylinder-sections from the drawn cylinder while it remains integral with the molten glass, embracing an annular heating device for heating the cylinder at the parting-line.

5. A glass-cylinder-drawing apparatus comprising means for drawing a cylinder from molten glass, and means for segregating cylinder-sections from the drawn cylinder while it remains integral with the molten glass, embracing an annular heating device for heating the cylinder at the parting-line, and a cutting-disk adapted to be revolved about the cylinder with its edge in severing contact therewith.

6. Mechanism for drawing cylinders from molten glass comprising, in combination with means for drawing the cylinder, means for segregating cylinder-sections from the drawn cylinder, and an annular gripping device adapted to engage the cylinder while integral with the molten glass, and after the segregated sections are removed, to continue the drawing operation.

7. In a glass-cylinder-drawing apparatus, a gripping device for grasping the upper end of a cylinder and provided with a passage through which fluid may be introduced to said cylinder, said gripping device being constructed to act as a seal for the upper end of the cylinder.

8. In a glass-cylinder-drawing apparatus, mechanism for drawing a cylinder from molten glass, means for segregating cylinder-sections from the drawn cylinder while it remains integral with the molten glass, and an annular gripping device adapted to engage the cylinder while integral with the molten glass and after the segregated sections are removed, to continue the drawing operation, said gripping device constituting part of mechanism for removing segregated cylinder-sections.

9. A glass-cylinder-drawing apparatus comprising means for drawing a cylinder from molten glass, means for segregating cylinder-sections from the drawn cylinder, a gripping device adapted to grasp the cylinder while integral with the molten glass and after the segregated sections are removed, for continuing the drawing operation, means for sealing the cylinder and means for introducing fluid under pressure into said cylinder.

10. A glass-cylinder-drawing apparatus comprising means for drawing a cylinder from molten glass, means for segregating cylinder-sections from the drawn cylinder, a gripping device adapted to grasp the cylinder while integral with the molten glass and, after the segregated sections are removed, for continuing the drawing operation, means for sealing the cylinder and means for introducing fluid under pressure into said cylinder, through said gripping device.

11. A glass-cylinder-drawing apparatus comprising means for drawing a cylinder from molten glass, means for segregating cylinder-sections from the drawn cylinder while it remains integral with the molten glass, a gripping device adapted to grasp the upper end of the cylinder which is integral with the molten glass to continue the drawing operation, said gripping device being provided with a passage through which a fluid-pressure is introduced to said cylinder and constructed to act as a seal for the upper end of said cylinder.

12. A glass-cylinder-drawing apparatus comprising an annular bait for drawing a cylinder from molten glass, means for segregating cylinder-sections from the drawn cylinder, an annular stationary gripping device for supporting the cylinder after the segregating operation, and an annular movable gripping device adapted to engage the cylinder integral with the molten glass for continuing the drawing operation.

13. A glass-cylinder-drawing apparatus comprising an annular bait for drawing a cylinder from molten glass, means for segregating the bait from the cylinder, means for supporting the cylinder after the segregation of the bait therefrom, and means engaging the cylinder for continuing the drawing operation, said segregating means thereafter acting to segregate or remove cylinder-sections from the cylinder while integral with the molten glass.

14. A glass-cylinder-drawing apparatus comprising a bait for drawing a cylinder from molten glass, means for parting the bait from the cylinder, means for supporting the cylinder after the bait has been parted therefrom, a movable gripping device for engaging the cylinder to resume the drawing operation, and means for introducing air under pressure to said cylinder through said movable gripping devices and bait.

15. An apparatus for drawing glass cylinders comprising means for drawing a cylinder from molten glass, means for segregating cylinder-sections from the drawn cylinder, and a plurality of gripping devices acting successively to remove the segregated cylinder-sections.

16. An apparatus for drawing glass cylinders comprising means for drawing a cylinder from molten glass, means for segregating cylinder-sections from the drawn cylinder, a plurality of gripping devices, means coöperating with said gripping devices and acting successively to remove the segregated sections, means for sealing said drawn cylinder, and means for introducing a fluid under pressure to the interior of said drawn cylinder.

17. An apparatus for drawing glass cylinders comprising means for drawing a cylinder from molten glass, means for segregating cylinder-sections from the drawn cylinder, a plurality of gripping devices and means coöperating with said gripping devices and acting successively to remove the segregated cylinder-sections, said gripping devices being constructed to act as a seal for the upper end of the drawn cylinder and being provided with a passage through which air may be introduced into the interior of the drawn cylinder.

18. A glass-cylinder-drawing apparatus comprising a bait for drawing a cylinder from molten glass, means for parting said bait from the cylinder, and for segregating cylinder-sections from the cylinder while integral with the molten glass, a gripping device adapted to engage the upper end of the cylinder to continue the drawing operation, means coöperating with said gripping device for removing said segregated cylinders to a repository, and a second and similar gripping device adapted to repeat the operation of the first.

19. A glass-cylinder-drawing apparatus comprising a bait for drawing a cylinder from molten glass, means for parting the bait from the cylinder and for segregating the cylinder-sections from the cylinder integral with the molten glass, a stationary gripping device for supporting the cylinder integral with the molten glass after such parting operation, a movable grip adapted to engage the cylinder integral with the molten glass for continuing the drawing operation, said cylinder being supported by the stationary gripping device after the cylinder-sections are segregated therefrom, and a second gripping device adapted to repeat the operation of the first.

20. A glass-cylinder-drawing apparatus comprising a bait adapted for drawing a cylinder from molten glass, means for parting the bait from the cylinder and for segregating cylinder-sections from the cylinder integral with the molten glass, a stationary gripping device for supporting the cylinder integral with the molten glass after such parting operation, a movable gripping device adapted to engage the cylinder integral with the molten glass for continuing the drawing operation, said cylinder integral with the molten glass being supported by the stationary gripping device after such segregation, and a second movable gripping device adapted to repeat the operation of the first, said movable gripping devices being attached to the opposite ends of a cable, whereby one of said devices is lowered while the other is raised and vice versa.

21. An apparatus for drawing glass cylinders comprising, in combination with a receptacle for molten glass having a draft-opening, a rotative head provided with arms, the outer ends of which are adapted to be swung over the draft-opening of the receptacle, pulleys on the outer ends of said arms, a cable trained about one of said pulleys and connected at its lower end with a bait, a cable trained about pulleys on two other arms of said head, and gripping devices attached to the opposite ends of said cable.

22. An apparatus for drawing glass cylinders comprising, in combination with a receptacle for molten glass having a draft-opening, a rotative head provided with arms, the outer ends of which are adapted to be swung over the draft-opening of the receptacle, pulleys on the outer ends of said arms, a cable trained about one of said pulleys and connected at its lower end with a bait, a cable trained about pulleys on two other arms of said head and provided with gripping devices and a stationary gripping device supported over said draft-opening of the receptacle.

23. A glass-cylinder-drawing apparatus comprising, in combination with a receptacle for molten glass having a draft-opening, a rotative head provided with arms, the outer ends of which are adapted to be swung vertically over the draft-opening of the said receptacle, pulleys on the outer ends of said arms, a cable trained about two of the pulleys, gripping devices supported by the ends of said cable, a second cable trained about the pulley of one of the other arms, a bait supported by said second cable, and pipes communicating with the bait and the gripping devices through which air is adapted to be introduced to the cylinder.

24. A glass-cylinder-drawing apparatus comprising, in combination with a receptacle for molten glass having a draft-opening, a rotative head provided with arms, the outer ends of which are adapted to be swung vertically over the draft-opening of the said receptacle, pulleys on the outer ends of said arms, a cable trained about two of the pulleys, gripping devices supported by the ends of said cable, a second cable trained about the pulley of one of the other arms, a bait supported by said second cable and a stationary gripping device supported over the draft-opening of said receptacle through which the cylinder is adapted to be drawn.

25. A glass-cylinder-drawing apparatus comprising, in combination with a receptacle for the molten glass having a draft-opening, a rotative head provided with arms, the outer ends of which are adapted to be swung vertically over the draft-opening of said receptacle, pulleys on the outer ends of said arms, a cable trained about two of said pulleys, gripping devices supported by the ends of said cables, a second cable trained about the pulley of one of the other arms, a bait supported by said second cable, pipes communicating with said bait and the gripping devices through which air is adapted to be introduced to the cylinder, a stationary gripping device supported vertically over the draft-opening of said receptacle and through which the cylinders are adapted to be drawn, a distributing-head supported on said rotative head, and flexible pipes connecting said distributing-head with the pipes which communicate with the bait and gripping devices.

26. A glass-cylinder-drawing apparatus comprising means for drawing a cylinder from molten glass, means for segregating cylinder-sections from the cylinder integral with the molten glass embracing a revoluble cutter which travels around and severs the cylinder, and a plurality of gripping devices acting to successively remove the cylinder-sections.

27. A glass-cylinder-drawing apparatus comprising means for drawing a cylinder from molten glass, means for segregating cylinder-sections from the cylinder integral with the molten glass, embracing a revoluble cutter which travels around and severs the cylinder, means for heating the cylinder at the parting-line, and means for successively removing the cylinder-sections from the cylinder which is integral with the molten glass.

28. A glass-cylinder-drawing apparatus comprising in combination with a receptacle for the molten glass having a draft-opening, means for drawing a cylinder from the molten glass, a gripping device located over the draft-opening of the receptacle through which the cylinder is drawn, which gripping device is adapted in certain parts of the operation to support said cylinder, and means for segregating cylinder-sections from the cylinder integral with the molten glass, embracing a cutter which is mounted on the rotative part of said gripping device and adapted to travel around and sever said sections, and means for heating the cylinder at the parting-line.

29. A glass-cylinder-drawing apparatus comprising means for drawing a cylinder from molten glass, means for segregating cylinder-sections from the cylinder integral with the molten glass, means for supporting the cylinder integral with the molten glass after the segregating operation, means for heating the cylinder at the line of departure from the molten glass during the suspension of the drawing operation.

30. A glass-cylinder-drawing apparatus comprising means for drawing a cylinder from molten glass, means for segregating cylinder-sections from the drawn cylinder, means for supporting said cylinder which is integral with the molten glass after such segregating operation, means for applying a cooling agent to the cylinder at the line of departure from the molten glass during the drawing operation, and supplemental means for applying a heating agent to said part of the cylinder during the suspension of the drawing operation.

31. Mechanism for drawing a glass cylinder from molten glass, means for segregating cylinder-sections from the drawn cylinder while it remains integral with the molten glass, means for removing the segregated cylinder-sections and a support for the segregated sections constructed to maintain said sections in vertical position until they become cold.

In testimony that we claim the foregoing as our invention we affix our signatures, each in presence of two witnesses, this 20th day of November, A. D. 1902, at Wilcox, Elk county, Pennsylvania.

JAPHUS GEORGE.
CHRISTOPHER MICHAEL SHORTLE.

Witnesses for George and Shortle:
BENJ. F. GEORGE,
D. K. CONDON.

And this the 15th day of November, A. D. 1902, at Chicago, Cook county, Illinois.

BRUCE CLARK WHITE.

Witnesses for White:
WILLIAM L. HALL,
GEORGE R. WILKINS.